United States Patent [19]

Muller

[11] 4,100,109

[45] Jul. 11, 1978

[54] CATALYST AND A PROCESS FOR THEIR PREPARATION

[75] Inventor: Alain Muller, Le Havre, France

[73] Assignee: Compagnie Francaise de Raffinage, Paris, France

[21] Appl. No.: 748,303

[22] Filed: Dec. 7, 1976

[30] Foreign Application Priority Data

Dec. 8, 1975 [FR] France ............................ 75 37507

[51] Int. Cl.$^2$ .................. B01J 21/04; B01J 23/28; B01J 23/30; B01J 23/74
[52] U.S. Cl. ............................. 252/465; 252/466 J
[58] Field of Search ........................ 252/466 J, 465

[56] References Cited

U.S. PATENT DOCUMENTS

| | | | |
|---|---|---|---|
| 2,878,193 | 3/1959 | Scott | 252/465 |
| 3,227,646 | 1/1966 | Jacobson et al. | 208/254 H |

*Primary Examiner*—W. J. Shine
*Attorney, Agent, or Firm*—Curtis, Morris & Safford

[57] ABSTRACT

Catalysts whose carrier is formed of an intimate mixture of aluminum oxide and at least one oxide of a second metal from groups VIB and VIII of the periodic table of the elements. The active phase of these catalysts comprises at least one metal from groups III to VIII of the periodic table. Also preparation of such catalysts by impregnation of a carrier with a solution containing ions of the metal of the active phase, said impregnation being followed by drying and calcination, the carrier used having been prepared by coprecipitation in the form of a gel from aqueous and/or organic solutions of the metals of which it is made up, coprecipitation being followed by drying and impregnation. Also hydrosulfurization and other uses for these catalysts.

33 Claims, No Drawings

CATALYST AND A PROCESS FOR THEIR PREPARATION

The present invention relates to new catalysts. It further relates to a process of preparation of these catalysts and to their use in the conversion of hydrocarbon charges.

It is known that the petroleum, petrochemical and chemical industries are increasingly employing processes using catalysts designed to facilitate the desired conversions. These catalysts are combinations of elements such as metals and of carriers well known to the person skilled in the art. In the petroleum industry, for example, alumina, silica and aluminosilicate carriers are widely used. On these have been deposited active phases containing noble metals, the metals of group VIII or, generally, the metals of groups III to VIII of the periodic table of the elements, alone or in combination with one or more other metals. In this specification, active phase refers both to metal compounds such as oxides or sulfides, for example, and to the metals themselves.

As a very common example, the processes for the hydroreforming of hydrocarbon charges use catalysts containing platinum, alone or in combination with one or more other metals, deposited on alumina. Among the other metals possibly entering, like platinum, into the composition of the active phases are tin or lead, germanium, rhenium, and mixtures of compounds of these metals, for example. A great many catalytic formulas have been developed for reforming: Monometallic catalysts, in which the active phase contains but one metal, usually platinum; bimetallic catalysts, in which a metal from group VIII, usually platinum, enters into the composition of the active phases with a second metal called promoter, for example, iridium, manganese, tin, lead, germanium, rhenium, etc.; and, for the last few years, tri- or tetrametallic formulas involving multiple associations of several active phases comprising one or more metals from groups III to VIII.

The same is true of the catalysts used in hydroisomerization reactions. These catalysts comprise in their active phases one or more metals and are usually superhalogenated. That is to say, they contain a rather high proportion of a halogen in combined form, generally chlorine. The carriers are very often formed of alumina.

Alumina is widely used also as a carrier in hydrocarbon desulfurization catalysts, the active phases deposited on the carrier then comprising metals such as molybdenum, tungsten, cobalt or nickel. These desulfurization processes are coming into even wider use today because of the increasingly more stringent standards imposed on the refiners with a view to lowering the sulfur content of fuels such as gas oil or the fuel oils to a level compatible with reduced pollution. When they contain sulfur compounds, products which are to be burned will, upon combustion, give off sulfur oxides that are harmful to the environment.

A special effort has therefore been made to develop advantageous desulfurization techniques of good yield and efficiency whose performance is largely dependent on the use of suitable catalytic formulas.

Most often, these are composed of a refractory mineral oxide carrier such as aluminosilicate or an alumina on which active phases such as the aforesaid metals have been deposited.

Thus, U.S. Pat. No. 3,509,044 describes a process for the hydrodesulfurization of a petroleum residue in the presence of a catalyst containing a molybdenum salt (the sulfide or the oxide) and a cobalt or nickel salt (the sulfides or the oxides) deposited on a carrier containing silica or alumina.

British Pat. No. 1,311,473 describes hydrocarbon desulfurization catalysts containing from 4 to 10% molybdenum, from 1 to 5% nickel or cobalt or a mixture thereof, and from 1 to 5% uranium, deposited on alpha-alumina, these percentages being weight percent.

British Pat. No. 1,313,005 describes a process for the preparation of a catalyst which consists in impregnating alumina or a silica-alumina mixture with a phosphoric solution of a metal from the molybdenum and tungsten group on the one hand and the nickel and cobalt group on the other hand.

Many other publications might be cited that describe desulfurization catalysts which essentially consist of a carrier formed by alumina or a silica-alumina mixture on which at least one active metal from the group consisting of nickel, cobalt, molybdenum, tungsten and uranium has been deposited by impregnation.

The work done by the applicant has led to the development of new catalysts comprising particular carriers which render them more efficient than conventional catalysts comprising identical active phases, especially in conversion reactions of hydrocarbon fractions.

A first objective of the present invention thus is to propose new catalysts, particularly for the conversion of hydrocarbon fractions.

A second objective of the invention is to improve the performance of the processes for conversion of hydrocarbon fractions, and particularly desulfurization, by making use of catalysts comprising carriers perfected in accordance with the invention.

The invention has as a first embodiment, catalysts comprising in combination a carrier formed of an intimate mixture of aluminum oxide and at least one oxide of a second metal selected from groups VIB and VIII of the periodic table of the elements on the one hand, and an active phase comprising at least one metal selected from groups III to VIII of the periodic table of the elements on the other hand.

The invention has as a second embodiment, catalysts comprising in combination a carrier formed of an intimate mixture of aluminum oxide and at least one oxide of a second metal selected from the group consisting of nickel, molybdenum, tungsten and cobalt on the one hand, and an active phase comprising at least one metal selected from groups III to VIII of the periodic table of the elements on the other hand.

Another embodiment of the invention are catalysts comprising in combination a carrier formed of an intimate mixture of aluminum oxide and at least one oxide of a second metal selected from the group consisting of nickel, molybdenum, tungsten, and cobalt on the one hand, and an active phase comprising at least one metal selected from groups VIII and VIB of the periodic table of the elements on the other hand.

Still another embodiment of the invention is a process of preparation of a catalyst, characterized by the fact that a carrier formed of an intimate mixture of aluminum oxide and at least one oxide of said second metal is impregnated with a solution containing ions into the constitution of which the metal to be present in said active phase enters; that the carrier so impregnated is dried at between 70° and 140° C; and that the dry product obtained is calcined at between 400° and 700° C, said product having been obtained by coprecipitation in the form of a gel from aqueous and/or organic solutions of aluminum and at least one metal from groups VIB and VIII of the periodic table of the elements, said coprecipitation being followed by drying and possibly by calcination of said gel.

The invention has as a further embodiment a process of preparation of the catalysts defined above, characterized by the fact that a carrier formed of an intimate mixture of aluminum oxide and at least one oxide of said second metal is impregnated with a solution containing ions into the constitution of which the metal to be present in said active phase enters; that the carrier so impregnated is dried; and that it is possibly calcined.

The invention further has as an embodiment the use of catalysts as defined above in the conversion of hydrocarbon charges, characterized by the fact that the hydrocarbon charge and a catalyst as defined above are contacted with each other under the usual conditions for the type of reaction in question.

Additionally, the invention has as an embodiment a process for the desulfurization of a hydrocarbon charge containing sulfur compounds and/or sulfur itself which consists in contacting said hydrocarbon charge, hydrogen, and certain of the catalysts defined above with one another under known desulfurization conditions.

The carriers which enter into the constitution of the catalysts in accordance with the invention may be prepared by hydrolysis of an aluminum alcoholate with an aqueous solution of at least one water-soluble salt of said second metal, said hydrolysis being followed by drying and possibly by calcination.

The new carriers so prepared have been found to be formed of an intimate mixture of the various elements entering into their composition. Intimate mixture means that the solids obtained exhibit a very good distribution of the aluminum and of the second metal in the mass of the carrier, this distribution being better than that obtained by the usual grinding operations.

The proportion of the various constituents of the carrier may vary over a wide range. However, the applicant deems it preferable to limit the weight percent of the oxide of the second metal or of the second metal oxide to 20% and even to about 15% by weight of the alumina, the minimum effective percentage being approximately 0.1 wt. %.

The process of preparation of these carriers comprises several steps.

The first of these is coprecipitation of a gel by hydrolysis, for example, of an aluminum alcoholate — such as, aluminum isopropylate or an aluminum butylate — in solution, the concentration thereof varying from 1 to 70% by weight and being preferably about 20% — for example, in a hydrocarbon such as benzene, toluene or heptane — with an aqueous solution of a water-soluble salt of at least one metal from groups VIB and VIII, for example, cobalt, molybdenum, tungsten or nickel, of a concentration comprised between $3 \times 10^{-2}$ and 1 gram atom per liter of solution. Examples of a water-soluble metal salt are the nitrate or the acetate. However, other salts may also be used. The two solutions — the organic solution containing the aluminum alcoholate and the aqueous solution containing the metal salt or salts — are contacted with each other at ordinary temperature or, more generally, at a temperature comprised between 0° and 50° C and then agitated, with a gel then forming. The quantity of water to be used may be from one to three times the stoichiometric quantity for securing precipitation.

The gel obtained is subjected to maturing for a period of greater or less duration which may be as long as one or two days but in no case shorter than 10 minutes, the gel being allowed to stand or being agitated. The solvents are then removed by any means known in the art, such as lyophilization, bakeout, filtration, vacuum evaporation, etc. The applicant has successfully used vaporization under subatmospheric pressure.

A hydrated gel is thus recovered which has the approximate formula $Al_2O_3.x\ MO.3H_2O$, where MO represents the oxide of nickel, molybdenum, cobalt or tungsten. When a plurality of aqueous solutions of salts of different metals have been used, a gel of formula $Al_2O_3.y\ MO + z\ M'O + \ldots .3H_2O$ is obtained.

This gel may be oven-dried at temperatures comprised between 70° and 140° C, then possibly calcined at a temperature ranging from 400° to 700° C.

After calcination, the textural properties of the solid obtained, which forms the carrier in accordance with the invention, are particularly interesting. The carrier has a specific surface of about 500 to 800 m$^2$/g and a pore volume comprised between approximately 1 and 1.5 cc/g.

The solid obtained, which is finely divided and is formed of the trihydrated or unhydrated organogel (the water of constitution may have been eliminated during calcination), is steeped in an organic solvent such as toluene or heptane or another liquid hydrocarbon. The amounts of solvent to be added are in the neighborhood of the impregnation volume of the solid. The whole is kneaded for homogenization.

The paste obtained is then subjected to peptization with an acid such as nitric acid in solution. Before this operation, the paste may be moistened by the addition of water in amounts which may be as great as 65 to 70 wt. %, based on the weight of the dry gel. The amount of acid necessary for peptization is comprised between 0.5 and 10% and, in general, is less than 5% by weight of the dry gel. The acid, preferably in solution, is added a little at a time, the paste being continuously kneaded.

Kneading is continued until separation of the constituents of the mixture sets in, which liberates the organic solvent. The liquid phase is eliminated and the paste is recovered and subjected, under the usual conditions, to an extrusion or any other mode of forming, such as granulation.

After this mechanical forming, the solid is dried at a temperature comprised between 70° and 140° C, then calcined at a temperature between 400° and 700° C, and preferably between 500° and 600° C.

The solids so obtained are very good catalyst carriers. Their textural properties are about one-half those of the starting solid, their specific surface being comprised between 100 and 500 m$^2$/g and their pore volume being greater than 0.1 cc/g.

To produce the catalysts, the active phases containing at least one metal from groups III to VIII of the periodic table of the elements must then be deposited on these carriers.

For example, to produce hydrodesulfurization catalysts for hydrocarbon charges, the active phases to be deposited are the metals of groups VIII and VIB of the periodic table of the elements. Said active phase metals are preferably comprised between 1 and 20% calculated as an element of the total mass of the catalyst.

The technique of deposition used by the applicant is impregnation of the carrier with solutions containing the metals, either in anionic or in cationic form, into the composition of which they enter. After impregnation with these solutions, the solid obtained is dried at between 70° and 140° C, then calcined in air at between 400° and 700° C, and preferably between 400° and 600° C.

The percentage of the metals so deposited on the carrier ranges from 1.5 to 20 wt. %, based on the total mass of the catalyst.

The applicant has thus prepared very good catalysts suitable for desulfurization and comprising a carrier of alumina and of an oxide of a second metal (particularly nickel or molybdenum), said carrier being impregnated with solutions containing cobalt or molybdenum, or both, to give catalysts whose cobalt- and molybdenum-oxide contents are comprised between 1 and 5 wt. % (and preferably between 2 and 4 wt. %), and between 10 and 20 wt. % (and preferably between 12 and 18 wt. %), respectively.

The catalytic formulas so obtained are particularly effective in processes for the desulfurization of hydrocarbon fractions, particularly the fractions usually called atmospheric gas oil, fuel oils, or vacuum gas oil.

Before the hydrocarbon desulfurization operation, it may be advantageous to presulfurize these catalysts by prior-art processes. In general, after they have been placed under hydrogen pressure at between 50° and 200° C, the temperature is raised to about 350° to 400° C while compounds susceptible of liberating sulfur, such as mixtures of hydrogen and hydrogen sulfide, mercaptans or carbon sulfuide or even a sulfurous gas oil are passed over the catalyst.

This operation is carried out in the presence of hydrogen. The hydrocarbons to be desulfurized generally are in the liquid phase and the reaction conditions are as follows: The temperature is comprised between 300° and 500° C, the pressure between 30 and 180 bars. The volume ratio between hydrogen and hydrocarbons ranges from 100 to 800 standard liters per liter, and the space velocity (vol./vol./hr.) of the charge, measured in the liquid state, is preferably comprised between 1 and 5.

The catalysts in accordance with the invention are not, of course, limited to the hydrodesulfurization of hydrocarbon fractions but may be used in many other types of reactions, according to the nature of their active phase, and particularly to processes for the conversion of hydrocarbon charges generally.

The examples which follow are illustrative of the preparation and properties of the carriers in accordance with the invention. They also relate to the making of catalysts for the conversion of hydrocarbon fractions from said carriers and to the uses of said catalysts. These examples are, of course, in no wise limitative.

EXAMPLE 1

This example illustrates the preparation of carriers in accordance with the invention.

Aluminum isopropylate dissolved in an organic solvent is hydrolyzed, at ambient temperature and with agitation, with an aqueous solution of a water-soluble salt of nickel, tungsten, cobalt or molybdenum.

After precipitation of the gel obtained, the solvent is evaporated at a temperature of about 60° C under subatmospheric pressure.

This removal of the solvent is followed by a moistening of the gel with water and then by peptization with a 1 N solution of nitric acid.

After the paste obtained has been kneaded, it is put in the form of extrudates 1.5 mm in diameter, which are then calcined at about 550° C. Table 1 which follows gives the operating parameters of the various steps in the preparation of a dozen carriers, designated A to L. Also presented in that table are, for control purposes, the conditions of preparation of two pure alumina carriers, T1 and T2, prepared under the same conditions, as well as of two other control carriers, $T_1'$ and $T_2'$, respectively, prepared by hydrolysis of aluminum butylate in place of aluminum isopropylate.

Table 1

| Carrier | ORGANIC SOLUTON | | AQUEOUS SOLUTON | | FORMING | | |
|---|---|---|---|---|---|---|---|
| | Weight of aluminum isopropylate or butylate used (grams) | Volume of toluene | Weight and designation of salt used | Weight of water (grams) | Volume of water for moistening in wt. %, based on dry gel | Amount of acid for peptization, in wt. %, based on dry gel | Constitution of solid obtained after calcination (wt. %) |
| A | 1,386 | 7.98 l | | | 63.6 | 4 | 99% $Al_2O_3$ |
| B | 792 | 4.56 l | $Ni(NO_3)_2 \cdot 6H_2O$ 13.6 g | 364 | 63.5 | 4 | 1% NiO 99% $Al_2O_3$ |
| C | 156.8 | 910 cc | $Ni(CH_3COO)_2 \cdot 4H_2O$ 6.64 g | 208.8 | 67 | 1 | 1% NiO 98% $Al_2O_3$ |
| D | 156.8 | 910 cc | $Ni(NO_3)_2 \cdot 6H_2O$ 3.10 g | 40.8 | 67 | 1 | 2% NiO 95% $Al_2O_3$ |
| E | 156.8 | 910 cc | $Ni(NO_3)_2 \cdot 6H_2O$ 8.05 g | 39.8 | 69 | 1 | 5% NiO 90% $Al_2O_3$ |
| F | 300 | 1.72 l | $Ni(NO_3)_2 \cdot 6H_2O$ 16.9 g | 37 | 64.5 | 1 | 10% NiO 99.6% $Al_2O$ 0.4% $WO_3$ |
| G | 300 | 1.72 l | 0.33 g ammonium para-tungstate | 79.5 | 75.5 | 1 | 99% $Al_2O_3$ 1% $WO_3$ |
| H | 238 | 1.37 l | 0.83 g ammonium para-tungstate 2.34 g hexahydrated cobalt nitrate | 79.5 | 63.5 | 1 | 99% $Al_2O_3$ 1% CoO |
| I | 235 | 1.35 l | 4.8 g hexahydrated | 62.4 | 63.5 | 1 | 98% $Al_2O_3$ |

Table 1-continued

| Carrier | ORGANIC SOLUTON Weight of aluminum isopropyl-ate or butylate used (grams) | Volume of toluene | AQUEOUS SOLUTON Weight and designation of salt used | Weight of water (grams) | FORMING Volume of water for moistening in wt. %, based on dry gel | Amount of acid for peptiza-tion, in wt. %, based on dry gel | Constitution of solid ob-tained after calcination (wt. %) |
|---|---|---|---|---|---|---|---|
| J | 238 | 1.37 l | cobalt nitrate 0.736 g tetrahydrated | 63.3 | 65.1 | 1 | 2% CoO 99% Al$_2$O$_3$ |
| K | 235 | 1.35 l | ammonium paramolybdate 1.476 g tetrahydrated | 63 | 63 | 1 | 1% MoO$_3$ 98% Al$_2$O$_3$ |
| L | 228 | 1.31 l | ammonium paramolybdate 3.69 g tetrahydrated | 61.8 | 63 | 1 | 2% MoO$_3$ 95% Al$_2$O$_3$ |
| T1 | 156.8 | 910 cc | ammonium paramolybdate — | 41.6 | 62 | 0.5 | 5% MoO$_3$ 100% Al$_2$O$_3$ |
| T2 | 156.8 | 910 cc | — | 41.6 | 62 | 1 | 100% Al$_2$O$_3$ |
| T$_1$' | 194.4 | 400 cc | — | 65 | 62 | 1 | 100% Al$_2$O$_3$ |
| T$_2$' | 194.4 | 400 c | — | 65 | 62 | 1 | 100% Al$_2$O$_3$ |

Table 2 which follows gives the textural properties (specific surface As, pore volume Vp, and average pore radius r) of some of the solids obtained, before being formed (gel) and/or after being formed (extrudates).

EXAMPLE 2

This example illustrates the preparation of catalysts with the aid of the carriers prepared in Example 1 and the use of said catalysts in desulfurization.

(A) PREPARATION OF CATALYSTS

The carriers A, B, F, G, H, I, J, L and T$_1$', granulated to 0.5 to 1 mm, are made to undergo an impregnation with a solution of hexahydrated cobalt nitrate and tetra-hydrated ammonium paramolybdate in a rotary evaporator in such quantity that the weight percent of oxides of cobalt CoO, and of molybdenum, MoO$_3$, determined after calcination of the solid obtained, are 2.5% and 17%, respectively, based on the total weight of the catalyst.

The carriers C, D, E, T1, T2 and T$_2$' are granulated to 0.5 to 1 mm, then subjected to impregnation in a rotary evaporator with an aqueous solution of hexahydrated cobalt nitrate and tetrahydrated ammonium paramolybdate in such quantity that the cobalt- and molybdenum-oxide contents of the catalyst finally obtained are 3% and 13.5%, respectively.

A portion of the carrier K (hereinafter designated K$_1$) is treated in a similar manner as carrier A while another portion of the carrier K (hereinafter designated K$_2$) is treated in the same manner as carrier C.

The compositions of the catalysts so obtained are given in Table 3 which follows.

Table 2

| CARRIER | BEFORE FORMING As (m$^2$/g) | Vp (cc/g) | r̄ (A) | AFTER FORMING As (m$^2$/g) | Vp (cc/g) | r̄ (A) |
|---|---|---|---|---|---|---|
| A | 572 | 1.07 | 37 | 273 | 0.50 | 37 |
| B | 542 | 1.2 | 44 | 280 | 0.58 | 42 |
| C | 573 | 1.12 | 39 | 268 | 0.46 | 38 |
| D | 585 | 1.12 | 38 | 269 | 0.42 | 31 |
| E | 560 | 0.75 | 27 | 253 | 0.36 | 28 |
| H | — | — | — | 284 | 0.55 | 39 |
| I | — | — | — | 278 | 0.48 | 35 |
| J | — | — | — | 290 | 0.57 | 39 |
| T$_1$ | — | — | — | 310 | 0.66 | 43 |

Table 2-continued

| CARRIER | BEFORE FORMING As (m$^2$/g) | Vp (cc/g) | r̄ (A) | AFTER FORMING As (m$^2$/g) | Vp (cc/g) | r̄ (A) |
|---|---|---|---|---|---|---|
| T$_2$ | — | — | — | 343 | 0.64 | 37 |
| T$_1$' | — | — | — | 277 | 0.72 | 52 |
| T$_2$' | — | — | — | 276 | 0.75 | 54 |

Table 3

| Catalyst | Carrier Al$_2$O$_3$ (%) | Second metal (%) | Active phase (wt. %, based on total weight) CoO | MoO$_3$ |
|---|---|---|---|---|
| A | 99 | 1 (NiO) | 2.5 | 17 |
| B | 99 | 1 (NiO) | 2.5 | 17 |
| C | 98 | 2 (NiO) | 3 | 13.5 |
| D | 95 | 5 (NiO) | 3 | 13.5 |
| E | 90 | 10 (NiO) | 3 | 13.5 |
| F | 99.6 | 0.4 (WO$_3$) | 2.5 | 17 |
| G | 99 | 1 (WO$_3$) | 2.5 | 17 |
| H | 99 | 1 (CoO) | 2.5 | 17 |
| I | 98 | 2 (CoO) | 2.5 | 17 |
| J | 99 | 1 (MoO$_3$) | 2.5 | 17 |
| K$_1$ | 98 | 2 (MoO$_3$) | 2.5 | 17 |
| K$_2$ | 98 | 2 (MoO$_3$) | 3 | 13.5 |
| L | 95 | 5 (MoO$_3$) | 2.5 | 17 |
| T$_1$ | 100 | — | 3 | 13.5 |
| T$_2$ | 100 | — | 3 | 13.5 |
| T$_1$' | 100 | — | 2.5 | 17 |
| T$_2$' | 100 | — | 3 | 13 |

(B) CATALYTIC HYDRODESULFURIZATION TESTS

The catalysts whose modes of preparation have been described above are subjected to hydrodesulfurization tests with two types of hydrocarbon charges, namely, a gas oil (GO) and a vacuum distillate (VGO).

The origin of the gas oil is Iraq, its gravity at 15° C is $d = 0.8385$, its distillation range, 219 to 355° C, and its sulfur content, 1%.

The vacuum distillate is from a "Safaniya" petroleum. Its characteristics are as follows:
Gravity at 15° C: 0.918
Viscosity (210° F = 99° C): 6.17 cst
CONRADSON carbon: 0.25
Average molecular mass: 380
Sulfur content: 2.83%

Distillation range: 281° to 510° C
(50% distilled point: 444° C)

A 10 cc reactor is filled with catalyst, which is presulfurized by means of the gas oil described above at 375° C for 5 hr. The operating conditions of the tests are as follows:

Table 4

| Charge | Hydrogen pressure (bars) | H$_2$/hydrocarbon ratio | Temp. | Space velocity |
|---|---|---|---|---|
| GO | 30 | 180 standard liters per liter of charge | 375° C | 5 |
| VGO | 30 | 670 standard liters per liter of charge | 300, 325, 350, 375° C | 3 |

The results of the tests may be evaluated on the basis of the final sulfur content of the hydrocarbon charge. These results are given in Table 5.

Table 5

| Catalyst | GO charge 375° C Final sulfur % | VGO charge Final sulfur, wt. % | | | |
|---|---|---|---|---|---|
| | | 300° C | 325° C | 350° C | 375° C |
| A | 0.05 | 1.94 | 1.27 | 0.76 | 0.28 |
| B | 0.034 | 1.83 | 1.26 | 0.75 | 0.25 |
| C | 0.03 | — | — | — | 0.30 |
| D | 0.05 | — | — | — | 0.33 |
| E | 0.06 | — | — | — | 0.48 |
| F | 0.05 | 1.82 | 1.32 | 0.79 | 0.35 |
| G | 0.05 | 1.89 | 1.34 | 0.81 | 0.32 |
| H | 0.04 | 1.74 | 1.26 | 0.80 | 0.31 |
| I | 0.03 | 1.80 | 1.20 | 0.72 | 0.28 |
| J | 0.04 | 1.90 | 1.29 | 0.79 | 0.35 |
| K$_1$ | 0.04 | 1.97 | 1.34 | 0.71 | 0.28 |
| K$_2$ | 0.05 | 2.00 | 1.33 | 0.79 | 0.31 |
| L | 0.03 | 1.89 | 1.31 | 0.74 | 0.27 |
| T$_1$ | 0.09 | — | — | — | 0.57 |
| T$_2$ | 0.08 | — | — | — | 0.50 |
| T$'_1$ | 0.15 | 2.28 | 1.56 | 1.18 | 0.49 |
| T$'_2$ | 0.09 | 2.51 | 1.72 | 1.26 | 0.63 |

It is apparent from this table that the catalysts in accordance with the invention are more efficient than catalysts whose carriers contain only pure alumina, the final sulfur content of the hydrocarbon charge being reduced more effectively, under the same test conditions, by catalysts A to L.

The applicant has further run identical tests on commercial catalysts prepared by deposition of metals (nickel and/or molybdenum and/or cobalt) on alumina (impregnation with solutions of salts of these metals). Thus it has tested four commercial formulas whose characteristics are as follows:

Table 6

| Catalyst | CoO Wt. % | MoO$_3$ Wt. % | NiO Wt. % | As (m$^2$/g) | Vp (cc/g) |
|---|---|---|---|---|---|
| T3 | 4.6 | 15.2 | — | 260 | 0.45 |
| T4 | 4.2 | 11.5 | <0.01 | 284 | 0.55 |
| T5 | 3.2 | 13.5 | 0.07 | 227 | 0.50 |
| T6 | — | 17.5 | 2.4 | 142 | 0.44 |

The tests run on these catalytic formulas produced the following results:

Table 7

| Catalyst | GO charge Final sulfur wt. % | VGO charge Final sulfur, wt. % | | | |
|---|---|---|---|---|---|
| | | 300° C | 325° C | 350° C | 375° C |
| T3 | 0.05 | 1.91 | 1.37 | 0.84 | 0.36 |
| T4 | 0.06 | 2.08 | 1.54 | 1.01 | 0.45 |
| T5 | 0.06 | 2.09 | 1.52 | 0.98 | 0.49 |
| T6 | 0.13 | 2.26 | 1.74 | 1.22 | 0.63 |

Comparison of the results presented in the above table with those obtained with catalysts A to L in accordance with the invention shows that the latter are more effective, the percent of final sulfur being lower in most cases.

EXAMPLE 3

This example illustrates the use of catalysts in accordance with the invention in hydrodesulfurization, a test different from that described in Example 2 being performed.

The catalytic volume introduced into the reactor here is 160 cc, and the catalyst is in the form of extrudates 1.5 mm in diameter.

The operating conditions are as follows:
Pressure: 41 bars
Hydrogen-to-hydrocarbon ratio: 710 standard liters per liter This test was run on catalyst B described in Example 2, using as charge the vacuum distillate (VGO) with 2.83 wt. % of sulfur as well as three commercial catalysts (catalyst T3, described in the preceding example, and two other catalysts, T7 and T8, whose characteristics are given in Table 8).

Table 8

| Catalyst | CoO Wt. % | MoO$_3$ Wt. % | As (m$^2$/g) | Vp (cc/g) |
|---|---|---|---|---|
| T7 | 2.8 | 14 | 215 | 0.40 |
| T8 | 5.4 | 11 | 94 | 0.33 |

The results obtained (final sulfur, wt. %) under different conditions of temperature and space velocity (vol./vol./hr.) are presented in Table 9.

Table 9

| Temperature | 350° C | 350° C | 380° C | 380° C | 380° C |
|---|---|---|---|---|---|
| Space velocity | 1 | 3 | 1 | 2 | 3 |
| B (Final sulfur, wt. %) | 0.19 | 0.45 | 0.04 | 0.09 | 0.21 |
| T3 (id.) | 0.35 | 0.76 | 0.08 | 0.19 | 0.29 |
| T7 (id.) | 0.37 | 0.79 | 0.085 | 0.21 | 0.32 |
| T8 (id.) | 0.385 | 0.81 | 0.091 | 0.22 | 0.33 |

I claim:

1. Catalyst comprising in combination (1) a carrier formed of an intimate mixture of aluminum oxide and nickel oxide, said carrier having been obtained by co-precipitating a gel from a solution of an organic salt of aluminum and an aqueous solution containing nickel, said co-precipitation being followed by drying and by calcination of said gel, and (2) an active phase on said carrier comprising at least one metal selected from groups VIII and VIB of the Periodic Table of the elements.

2. Catalyst according to claim 1, wherein the content of said oxide of nickel in the carrier is from 0.1 to 20% by weight of the alumina.

3. Catalyst in accordance with claim 1, wherein the percentage of the active phase metals from groups VIII and VIB is comprised between 1 and 20%, calculated as an element of the total mass of the catalyst.

4. Catalyst according to claim 3, wherein said active phase metals from groups VIII and VIB are in the catalyst in the form of oxides.

5. Catalyst according to claim 3, wherein the active phase metals present on the carrier are cobalt and molybdenum.

6. Catalyst according to claim 4, wherein the active phase metals present on the carrier are cobalt and molybdenum.

7. Catalyst according to claim 6, wherein the weight percent, based on the oxide form and on the total weight of the catalyst, of the cobalt and of the molybdenum are between 1 and 5% and between 10 and 20% respectively.

8. Catalyst according to claim 6, wherein the weight percent, based on the oxide form and on the total weight of the catalyst, of the cobalt and of the molybdenum are between 2 and 4%, and between 12 and 18%, respectively.

9. Process of preparation of a catalyst according to claim 3 comprising said carrier being impregnated with said active phase from a solution containing salts of the metal comprising said active phase, drying the carrier so impregnated at between 70° and 140° C, and calcining the dried product at between 400° and 700° C.

10. Catalyst for desulfurization of a hydrocarbon charge consisting essentially of a carrier formed of an intimate mixture of aluminum oxide and cobalt oxide and obtained by coprecipitating a gel from a solution of an organic salt of aluminum and an aqueous solution of a cobalt salt with said gel being dried and calcined, said cobalt being present as an oxide in an amount of from 0.1 to 20% by weight of the alumina, and deposited on said carrier an active phase comprising between 1 and 20% of at least one metal selected from groups VIII and VIB of the Periodic Table.

11. Catalyst according to claim 10, wherein said active phase comprises the oxides of Co and Mo and the weight percent, based on the oxide form and on the total weight of the catalyst, of the cobalt and of the molybdenum are between 1 and 5% and between 10 and 20% respectively.

12. Process of preparation of a catalyst according to claim 10 comprising said carrier being impregnated with said active phase from a solution containing salts of the metal comprising said active phase, drying the carrier so impregnated at between 70° and 140° C, and calcining the dried product at between 400° and 700° C.

13. Process of preparation of a catalyst according to claim 3, comprising said carrier being impregnated with said active phase from a solution containing salts of the metal comprising said active phase, drying the carrier so impregnated at between 70° and 140° C.

14. Process according to claim 13, wherein the impregnated carrier is calcined between 400° and 600° C.

15. Process of preparation of a catalyst according to claim 14, wherein said carrier has been obtained by:
   (a) hydrolysis of a solution of an organic aluminum salt in an organic solvent by mixture with an aqueous solution of at least one water-soluble salt of nickel, producing a gel;
   (b) drying of the gel obtained at between 70° and 140° C;
   (c) steeping of the gel in a second organic solvent, and kneading of the paste obtained;
   (d) peptization with an acid solution, the amount of acid to be used being comprised between 0.5 and 10% by weight of the dry gel;
   (e) elimination of the second organic solvent;
   (f) forming of the paste obtained under (e) by extrusion or granulation; and
   (g) drying at between 70° and 140° C, followed by the calcination at between 400° and 700° C.

16. Process according to claim 15, wherein there is a calcination in (b) between 400° and 700° C.

17. Catalyst comprising in combination:
   (1) a carrier formed of an intimate mixture of aluminum oxide and at least one oxide of a second metal selected from the group consisting of nickel, tungsten, molybdenum and cobalt, said carrier having been obtained by a process comprising the following principal steps:
      (a) hydrolysis of a solution of an organic aluminum salt in a first organic solvent by mixture with an aqueous solution of at least one water-soluble salt of said second metal, producing a coprecipitated gel;
      (b) drying of the gel obtained between 70° and 140° C;
      (c) steeping and then kneading the gel in a second organic solvent;
      (d) peptizing with an acid solution, the amount of acid to be used being between 0.5 and 10% by weight of the dry gel;
      (e) eliminating said second organic solvent;
      (f) mechanical forming by extrusion or granulation of the paste so obtained;
      (g) drying at between 70° and 140° C; and
      (h) calcining at between 400° and 700° C.

18. Catalyst according to claim 17, wherein said second metal oxide is present in said intimate mixture in an amount from about 0.1 to 20% by weight of the aluminum oxide.

19. Catalyst according to claim 18, wherein said second metal is nickel.

20. Catalyst according to claim 18, wherein said active phase metals from groups VIII and VIB are in the catalyst in the form of oxides.

21. Catalyst according to claim 20, wherein said active phase metals present on the carrier are cobalt and molybdenum.

22. Catalyst according to claim 21, wherein the weight percent, based on the oxide form and on the total weight of the catalyst, of the cobalt and of the molybdenum are between 1 and 5% and between 10 and 20%, respectively.

23. Catalyst according to claim 22, wherein said percentages are between 2 and 4%, and 12 and 18%, respectively.

24. Catalyst according to claim 22, wherein said second metal is nickel.

25. Catalyst according to claim 18, wherein between steps (b) and (c) said gel is calcined between 400° and 700° C.

26. Catalyst according to claim 18, wherein between steps (c) and (d) said gel is moistened with water in a proportion which may be as high as 70 wt. % based on the dry gel.

27. Catalyst according to claim 25, wherein between steps (c) and (d) said gel is moistened with water in a proportion which may be as high as 70 wt. %, based on the dry gel.

28. Process of preparation of a catalyst according to claim 18, comprising said carrier being impregnated with said active phase from a solution containing salts of the metal comprising said active phase, drying the carrier so impregnated at between 70° and 140° C, and calcining the dried product at between 400° and 600° C.

29. Catalyst for desulfurization of a hydrocarbon charge consisting essentially of a carrier formed of an intimate mixture of aluminum oxide and tungsten oxide and obtained by coprecipitating a gel from a solution of an organic salt of aluminum and an aqueous solution of a tungsten salt with said gel being dried and calcined, said tungsten being present as an oxide in an amount of from 0.1 to 20% by weight of the alumina, and deposited on said carrier an active phase comprising between 1 and 20% of at least one metal selected from groups VIII and VIB of the Periodic Table.

30. Catalyst according to claim 29, wherein said active phase comprises the oxides of Co and Mo and the weight percent, based on the oxide form and on the total weight of the catalyst, of the cobalt and of the molybdenum are between 1 and 5% and between 10 and 20% respectively.

31. Process of preparation of a catalyst according to claim 29, comprising said carrier being impregnated with said active phase from a solution, containing salts of the metal comprising said active phase, drying the carrier so impregnated at between 70° and 140° C.

32. Process of preparation of a catalyst according to claim 31, wherein said carrier has been obtained by:
   (a) hydrolysis of a solution of an organic aluminum salt in an organic solvent by mixture with an aqueous solution of at least one water-soluble salt of tungsten, producing a gel;
   (b) drying of the gel obtained at between 70° and 140° C;
   (c) steeping of the gel in a second organic solvent, and kneading of the paste obtained.
   (d) peptization with an acid solution, the amount of acid to be used being comprised between 0.5 and 10% by weight of the dry gel;
   (e) elimination of the second organic solvent;
   (f) forming of the paste obtained under (e) by extrusion or granulation; and
   (g) drying at between 70° and 140° C, followed by the calcination at between 400° and 700° C.

33. Process of preparation of a catalyst according to claim 12, wherein said carrier has been obtained by:
   (a) hydrolysis of a solution of an organic aluminum salt in an organic solvent by mixture with an aqueous solution of at least one water-soluble salt of cobalt, producing a gel;
   (b) drying of the gel obtained at between 70° and 140° C;
   (c) steeping of the gel in a second organic solvent, and kneading of the paste obtained;
   (d) peptization with an acid solution, the amount of acid to be used being comprised between 0.5 and 10% by weight of the dry gel;
   (e) elimination of the second organic solvent;
   (f) forming of the paste obtained under (e) by extrusion or granulation; and
   (g) drying at between 70° and 140° C, followed by the calcination at between 400° and 700° C.

* * * * *